United States Patent [19]

Cabioch et al.

[11] Patent Number: 6,013,718

[45] Date of Patent: *Jan. 11, 2000

[54] RUBBER COMPOSITION BASED ON SILICA AND ON FUNCTIONALIZED DIENE POLYMER WHICH HAS A SILANOL END FUNCTIONAL GROUP

[75] Inventors: Jean-Luc Cabioch; Gérard Labauze, both of Clermot-Ferrand, France

[73] Assignee: Michelin & Cie, Cedex, France

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/743,655

[22] Filed: Nov. 5, 1996

[30] Foreign Application Priority Data

Nov. 7, 1995 [FR] France ..................................... 95 13249

[51] Int. Cl.⁷ ................................ C08J 3/00; C08K 3/34; C08K 3/40; C08L 83/00

[52] U.S. Cl. .......................... 524/506; 524/492; 524/493; 524/495; 524/496; 524/858; 524/862; 524/865; 525/105

[58] Field of Search ...................... 524/506, 588, 524/571, 492, 493, 495, 496, 858, 862, 865; 525/105

[56] References Cited

U.S. PATENT DOCUMENTS

| | | | |
|---|---|---|---|
| 3,928,490 | 12/1975 | Hergenrother | 260/827 |
| 4,618,650 | 10/1986 | Halasa et al. | 525/105 |
| 5,066,721 | 11/1991 | Hamada et al. | 525/102 |
| 5,811,479 | 9/1998 | Labauze | 524/188 |

*Primary Examiner*—Patrick D. Niland
*Attorney, Agent, or Firm*—Baker & Botts, L.L.P.

[57] ABSTRACT

A rubber composition which has a reduced hysteresis making it particularly suitable for use as a tread of a tire having reduced rolling resistance, including silica as predominant reinforcing filler and at least one diene polymer bearing, as a chain end, a silanol functional group or a polysiloxane block which has a silanol end.

9 Claims, No Drawings

RUBBER COMPOSITION BASED ON SILICA AND ON FUNCTIONALIZED DIENE POLYMER WHICH HAS A SILANOL END FUNCTIONAL GROUP

BACKGROUND OF THE INVENTION

The present invention relates to a rubber composition which can be employed especially for the manufacture of tire covers and which has improved hysteresis properties in the vulcanized state, including a diene polymer functionalized at a chain end by a silanol functional group or a polysiloxane block which has a silanol end and silica as reinforcing filler.

Since fuel economies and the need to protect the environment have become a priority, it is desirable to produce polymers which have good mechanical properties and a hysteresis which is as low as possible in order to make it possible to use them in the form of rubbery compositions that can be employed for the manufacture of various semi-finished products forming part of the constitution of tire covers such as, for example, undercoats, cushion compounds between rubbers of different kinds or for coating metal or textile reinforcements, sidewall rubbers or treads and to obtain tires with improved properties, especially possessing a reduced rolling resistance.

Numerous solutions have been proposed in order to reach such an objective, consisting especially in modifying the nature of the diene polymers and copolymers at the end of polymerization by means of coupling or starring or functionalizing agents. A very large majority of these solutions have concentrated essentially on the use of polymers modified with carbon black as reinforcing filler with the aim of obtaining good interaction between the modified polymer and the carbon black. As examples illustrating this prior art we can cite U.S. Pat. No. 3,135,716, which describes the reaction of living chain-end diene polymers with a polyfunctional organic coupling agent to obtain polymers with improved properties, and U.S. Pat. No. 3,244,664, which describes tetraalkoxysilanes as coupling or starring agent for diene polymers.

The advantage of employing silica as reinforcing filler in rubber compositions intended especially to form part of the constitution of tire treads is very old. However, the use of silica as reinforcing filler in such compositions has remained very restricted because of the low level of some properties, especially the low abrasion resistance, of such compositions. Thus, it has been proposed to employ functionalized diene polymers instead of nonfunctionalized polymers. Virtually all of the prior art relates to polymers which are functionalized with alkoxysilane derivatives. For preference, tetraalkoxysilane derivatives which include tetraethoxysilane have been described and, more recently, alkoxysilanes in which the groups are or are not hydrolyzable have been disclosed.

By way of example of such prior art U.S. Pat. No. 3,244,664 may be mentioned, which describes diene polymers functionalized with siloxanes which have at least two alkoxy residues and compositions exhibiting improved properties. U.S. Pat. No. 5,066,721, which describes a diene rubber composition filled with silica, based on a diene polymer functionalized with the aid of an alkoxysilane which has at least one nonhydrolyzable alkoxy residue making it possible to remove the polymerization solvent from the polymers which are thus functionalized by stripping with steam.

Coupling reactions are often observed during such functionalization reactions and, in order to reduce them to a minimum, an excess of alkoxysilane and/or intense mixing are generally employed.

Furthermore, either the alkoxysilane functionalizing agents result in functionalized polymers which cannot be subjected to stripping with steam in order to remove the polymerization solvent because, in this case, they undergo a macrostructural change which produces a severe degradation of the potentially advantageous properties, or the functionalizing agents permitting the operation of stripping with steam belong to a very restrictive class of the alkoxysilanes described in U.S. Pat. No. 5,066,721 and are not available industrially, and this constitutes a handicap where industrial exploitation is concerned.

Despite the improvement in the properties obtained with the use of such polymers functionalized in this way, the silica-based compositions described in this prior art have not been found satisfactory for constituting tire treads.

In the prior art there are reports of polystyrenes bearing a silanol functional group as chain ends (Makromol. Chem. 79, 1964, p. 149–160), but these polymers are merely intermediate compounds. According to U.S. Pat. No. 4,618,650 it is also known to employ diene polymers functionalized with a silanol residue as intermediate compounds for the preparation of crosslinked diene polymers which have improved properties in the unvulcanized state, especially cold creep.

SUMMARY OF THE INVENTION

Applicant has surprisingly discovered that the diene polymers bearing, as chain end, a silanol functional group or a polysiloxane block which has a silanol end can be isolated from the reaction mixture resulting in their formation by extraction of the solvent with steam and impart properties of rubberiness to the vulcanized compositions including silica as reinforcing filler, and in particular hysteresis properties which are improved in relation to compositions based on unfunctionalized diene polymers and are at least of the same level as those of compositions based on alkoxysilane functionalized diene polymers.

The invention relates to a vulcanizable rubber composition including at least one functionalized diene polymer, silica as reinforcing filler and the usual other constituents of such compositions, in which the functionalized diene polymer is a diene polymer bearing as chain end a silanol functional group or a polysiloxane block which has a silanol end.

DESCRIPTION OF PREFERRED EMBODIMENTS

The compounds corresponding to the following general formula are preferably suitable as polysiloxane block which has a silanol end:

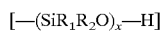

in which:

$R_1$ and $R_2$, which are identical or different, denote an alkyl, cycloalkyl, aryl, alkaryl, aralkyl or vinyl group which has from 1 to 10 carbon atoms, x is an integer ranging from 1 to 1500 and preferably from 1 to 50.

Diene polymers capable of being used in the composition in accordance with the invention are intended to mean any homopolymer obtained by polymerization of a conjugated diene monomer containing from 4 to 12 carbon atoms or any copolymer obtained by copolymerization of one or several conjugated dienes with each other or with one or more vinylaromatic compounds containing from 8 to 20 carbon atoms. Suitable conjugated dienes are especially 1,3-butadiene, 2-methyl-1,3-butadiene, 2,3-di($C_1$ to $C_5$-alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 1,3-pentadiene, 2,4-hexadiene, and the like.

Vinylaromatic compounds which are suitable are especially styrene, ortho-, meta- and para-methylstyrene, the commercial "vinyltoluene" mixture, para-tert-butyl-styrene, methoxystyrenes, vinylmesitylene, divinylbenzene, vinylnaphthalene, and the like.

The copolymers may contain between 99% and 20% by weight of diene units and from 1% to 80% by weight of vinylaromatic units.

The functionalized diene polymers bearing at the chain end a silanol functional group or a polysiloxane block which has a silanol end may have any microstructure which is a function of the polymerization conditions employed. The polymers may be block-containing, random, sequential/block, sequential/microblock, and the like, and may be prepared in dispersion or in solution. When an anionic polymerization is involved, the microstructure of these polymers can be determined by the presence or absence of a modifying and/or randomizing agent and the quantities of modifying and/or randomizing agent which are employed.

Polybutadienes are preferably suitable and in particular those which have a content of 1,2-units of between 4% and 80% polyisoprenes, butadiene-styrene copolymers and in particular those which have a styrene content of between 4 and 50% by weight and more particularly between 20% and 40% by weight, a content of 1,2-bonds of the polybutadiene portion of between 4% and 65%, a content of trans-1,4 bonds of between 30% and 80%, butadiene-isoprene copolymers and especially those which have an isoprene content of between 5 and 90% by weight and a glass transition temperature (Tg) of −40° C. to −80° C. isoprene-styrene copolymers and especially those which have a styrene content of between 5 and 50% by weight and a Tg of between −25° C. and −50° C. In the case of butadiene-styrene-isoprene copolymers, those which are suitable have a styrene content of between 5 and 50% by weight and more particularly between 10% and 40%, an isoprene content of between 15% and 60% by weight and more particularly between 20% and 50% by weight, a butadiene content of between 5 and 50% by weight and more particularly between 20% and 40% by weight, a content of 1,2-units of the butadiene portion of between 4% and 85%, a content of trans-1,4 units of the butadiene portion of between 6% and 80%, a content of 1,2- plus 3,4-units of the isoprene portion of between 5% and 70% and a content of trans-1,4 units of the isoprene portion of between 10% and 50% and more generally any butadiene-styrene-isoprene copolymer which has a Tg of between −20° C. and −70° C.

Any known mono- or polyfunctional anionic or non-anionic initiator may be employed as polymerization initiator. However, an initiator containing an alkali metal such as lithium or alkaline-earth metal such as barium is preferably employed. Organolithium initiators which are suitable are especially those containing one or more carbon-lithium bonds. Representative compounds are aliphatic organolithium compounds such as ethyllithium, n-butyllithium (n-BuLi), isobutyllithium, dilithiumpolymethylenes such as 1,4-dilithiobutane, and the like. Lithium amides are also preferred initiators because they produce polymers which have a polar group at the chain end not bearing the silanol functional group or the polysiloxane block which has a silanol end. Lithium amide is obtained from an acyclic or cyclic secondary amine; in this latter case pyrrolidine and hexamethyleneimine are highly preferred; it being possible for the said amide to be made soluble in a hydrocarbon solvent by virtue of the combined use of a solvating agent, for example an ether, as described in U.S. Pat. FR 2 250 774. Representative compounds containing barium are those described, for example, in Patent Applications FR-A-2 302 311 and FR-A-2 273 822 and the Certificates of Addition FR-A-2 338 953 and FR-A-2 340 958, the contents of which is incorporated here.

The polymerization is, as is known per se, preferably performed in the presence of an inert solvent which may be, for example, an aliphatic or alicyclic hydrocarbon like pentane, hexane, heptane, isooctane or cyclohexane, or an aromatic hydrocarbon like benzene, toluene or xylene.

The polymerization may be performed continuously or noncontinuously. The polymerization is generally performed at a temperature of between 20° C. and 120° C. and preferably near 30° C. to 90° C. A transmetallation agent may, of course, also be added at the end of polymerization to modify the reactivity of the living chain end.

The functionalized diene polymers used in the invention can be obtained by analogy using various processes. A first route consists in reacting, as described in the Journal of Polymer Science, Part A, Vol. 3, p. 93–103 (1965), the living diene polymer with an organosilane functionalizing agent, preferably on leaving the polymerization reactor and at a temperature that is identical or different and preferably near the polymerization temperature, to form a diene polymer which has a halosilane functional group as chain end and in subjecting it, as described in the handbook "Chemistry and Technology of Silicones", Academic Press, New York, N.Y. (1968), p. 95, to the action of a proton-donor to obtain the diene polymer functionalized with silanol as chain end. The concatenation of these 2 reactions has already been described by Greber and Balciunas in Makromol. Chem. 69, p. 193–205 (1963). As examples of organosilane functionalizing agents capable of reacting with the living diene polymer may be mentioned the linear dihalosilanes corresponding to the formula:

in which:

$R_1$ and $R_2$, which are identical or different, denote an alkyl, cycloalkyl, aryl, alkaryl, aralkyl or vinyl group containing from 1 to 10 carbon atoms, X denotes a halogen atom, preferably chlorine or bromine.

Dichlorodimethylsilane, dichlorodiethylsilane, dichlorodiphenylsilane, dichlorophenylmethylsilane and dichlorovinylmethylsilane may be mentioned as preferred dihalosilane compounds.

A second route consists in reacting the living polymer with a cyclic polysiloxane functionalizing agent to obtain a polymer which has an $SiO^-$ end, this being done in a medium which does not allow the polymerization of said cyclopolysiloxane. As cyclic polysiloxanes may be mentioned those corresponding to the formula:

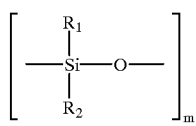

in which:
  R$_1$ and R$_2$, which are identical or different, denote an alkyl, cycloalkyl, aryl, alkaryl, aralkyl or vinyl group containing from 1 to 10 carbon atoms,
  m denotes an integer of value 3 to 8, and hexamethylcyclotrisiloxane, trimethyltriethylcyclotrisiloxane, octamethylcyclotetrasiloxane, decamethylcyclopentasiloxane and their mixtures may be mentioned as preferred cyclic polysiloxane compounds. The polymer comprising an Sio$^-$ end is next reacted with a proton-donor compound to produce the diene polymer functionalized with silanol as chain end.

A third route consists in preparing block copolymers comprising a polysiloxane block which has a silanol end by sequential polymerization. These block copolymers are obtained by the preparation, as described, for example, in U.S. Pat. Nos. 3,483,270 and 3,051,684 and in J. Appl. Poly. Sci. vol. 8, p. 2707–2716 (1964), of a first block of a living diene polymer which is next reacted, in a polar medium, with a cyclic polysiloxane which polymerizes anionically forming a second block, to produce a sequential block copolymer comprising a polysiloxane block which has an Sio$^-$ end which is next reacted with a proton-donor to produce the block diene copolymer comprising a polysiloxane block which has a silanol functional group as chain end.

A fourth route consists in preparing block copolymers comprising a polysiloxane block which has a silanol end by grafting 2 polymers, for example by grafting a dilithiated or disodiated polysiloxane onto a diene polymer which has an SiX end, X denoting a halogen atom, the product of grafting being next reacted with a proton-donor to produce the block copolymer comprising a polysiloxane block which has a silanol end, as described, for example, by Greber and Balciunas in Makromol. Chem. 79, p. 149–160 (1964) or mentioned by Plumb and Atherton in the handbook "Block Copolymers", Applied Science, England (1973) p. 339.

One or a number of antioxidant agents may, of course, be added to the reaction mixture before recovery of the functionalized polymer by conventional techniques, that is to say, either by coagulation or by evaporation by any means whatsoever, as, for example, vacuum evaporation and then drying if necessary, and even steam-stripping of the solvent, which is quite surprising for a person skilled in the art who expected a macrostructural change, as is usually the case with polymers that are functionalized with alkoxysilanes.

The functionalized diene polymers, bearing as chain end a silanol functional group or a polysiloxane block which has a silanol end, have a special suitability for being employed for forming rubber compositions including predominantly silica as reinforcing filler.

Any precipitated or pyrogenic silicas known to a person skilled in the art which have a BET surface $\leq$450 m$^2$/g and a CTAB specific surface $\leq$450 m$^2$/g are suitable as silica capable of being used in the invention, although the highly dispersible precipitated silicas are preferred.

A highly dispersible silica is intended to mean any silica which has a very high ability to deagglomerate and to disperse in a polymeric matrix, which can be observed by electron or optical microscopy on thin sections. The dispersibility of the silica is also assessed by means of a test for suitability to ultrasonic deagglomeration, followed by a measurement, by scattering on a particle size analyzer, of the size of the silica particles, to determine the median particle diameter (D50) and the deagglomeration factor (F$_D$) after deagglomeration as described in Patent Application EP-A-0 520 860, the content of which is incorporated here, or in the paper published in the journal Rubber World, June 1994, pages 20–24, entitled "Dispersibility measurements of prec. silicas".

As nonlimiting examples of such preferred, highly dispersible silicas may be mentioned which have a CTAB surface equal to or lower than 450 m$^2$/g and particularly those described in European Patent Applications EP-A-0 157 703 and EP-A-0 520 862, the content of which is incorporated herein, as e.g. the silicas Zeosil 1165 MP and 85 MP from the company Rhone-Poulenc, the silica Perkasil KS 430 from the company AKZO, the silica HI-Sil 2000 from the company PPG, and the silicas Zeopol 8741 or 8745 from the company Huber.

However, by way of preference, the silicas which are suitable have:
  a CTAB specific surface of between 120 and 200 m$^2$/g, preferably between 145 and 180 m$^2$/g,
  a BET specific surface of between 120 and 200 m$^2$/g, preferably between 150 and 190 m$^2$/g,
  a DOP oil uptake lower than 300 ml/100 g, preferably between 200 and 295 ml/100 g,
  a median diameter (Ø 50), after ultrasonic deagglomeration, which is equal to or smaller than 3 µm, preferably smaller than 2.8 µm, for example smaller than 2.5 µm,
  an ultrasonic deagglomeration factor (F$_D$) higher than 10 ml, preferably higher than 11 ml and more preferably $\geq$21 ml,
  a BET specific surface/CTAB specific surface ratio $\geq$1.0 and $\leq$1.2.

The physical state in which the silica is present, that is to say whether it is present in the form of powder, of micropearls, of granules or of beads, is of no significance.

Silica, of course, is also intended to mean blends of different silicas. The silica may be employed by itself or in the presence of other white fillers. The CTAB specific surface is determined according to the NFT method 45007 of November 1987. The BET specific surface is determined according to the method of Brunauer, Emmett and Teller, described in the Journal of the American Chemical Society, vol. 80, page 309 (1938), corresponding to NFT Standard 45007 of November 1987. The DOP oil uptake is determined according to NFT Standard 30–022 (March 1953), using dioctyl phthalate.

The beneficial effect with regard to the properties of the composition in accordance with the invention is greatest when the reinforcing filler consists exclusively of silica. However, a beneficial effect is also obtained when the reinforcing filler contains carbon black as a minor component, that is to say up to 49% by weight of the total filler; the improvement in the properties being, however, proportionately greater the lower the content of carbon black which is present. The quantity of carbon black which is present is preferably equal to or lower than 30% of the weight when a black/silica blend is employed.

Any of the carbon blacks that are commercially available or conventionally employed in tires and especially in the tire treads are suitable as carbon blacks. The blacks N 234, N 339, N 326, N 375 and the like may be mentioned as nonlimiting examples of such blacks.

The silanol-functionalized diene polymer may be employed by itself in the composition in accordance with the invention or may be employed as a blend with any other elastomer conventionally employed in tires, such as natural rubber or a blend based on natural rubber and a synthetic elastomer or else another diene polymer which is optionally coupled and/or starred or else partially or entirely functionalized with a functional group other than a silanol functional group. It is obvious that the higher the proportion of conventional elastomer present in the composition in accordance with the invention, the smaller will be the improvement in the properties. This is why the conventional elastomer may be present at between 1 and 70 parts by weight per 100 parts by weight of silanol functionalized polymer.

Besides one or more diene polymers and the silica, the compositions in accordance with the invention contain all or part of the other constituents and additives usually employed in rubber mixes, like plasticizers, pigments, antioxidants, antiozonant waxes, a vulcanizing system based either on sulfur and/or on peroxide and/or bismaleimides, vulcanization accelerators, extender oils, one or more agents for bonding the silica to the elastomer, or one or more coating agents for the silica, such as alkoxysilanes, polyols, amines and the like.

Another subject of the invention is a process for obtaining diene polymers bearing as chain end a silanol functional group or a polysiloxane block which has a silanol end, consisting in polymerizing one or more diene monomer(s) in the presence of a catalyst making it possible to obtain a living diene polymer, in reacting it with at least one organosilane and in recovering the diene polymer bearing as chain end a silanol functional group or a polysiloxane block which has a silanol end, by stripping the solvent with steam and then drying.

Finally, a subject of the invention is a process for obtaining block diene copolymers bearing as chain end a polysiloxane block which has a silanol end, consisting in grafting a dilithio- or disodiopolysiloxane on a diene polymer which has an (SiX) end, X denoting a halogen atom, in reacting the product of grafting with a proton-donor compound and in recovering the block copolymer comprising a polysiloxane block which has a silanol end by stripping the solvent with steam and then drying.

Another subject of the invention is tire treads and tires which have a reduced rolling resistance.

The invention is illustrated, without any limitation being implied, by the examples, which cannot constitute a limitation of the scope of the invention.

In the examples the properties of the compositions are evaluated as follows:

Mooney viscosity ML (1+4) at 100° C., measured according to ASTM Standard D-1646, entitled Mooney in the tables.

Elongation moduli at 300% (EM 300), 100% (EM 100) and 10% (EM 10): measurements performed according to ISO Standard 37.

Scott breaking indices: measured at 20° C. Break strength (BS) in MPa Elongation at break (EB) in %

Hysteresis losses (HL): measured by rebound at 60° C. in %.

The deformation for the losses measured is 40%

Shore A hardness: measurements performed according to DIN Standard 53505.

Dynamic properties in shear:

Measurements as a function of the deformation: performed at 10 Hertz with a peak-peak deformation ranging from 0.15% to 50%. The nonlinearity expressed is the difference in shear modulus between 0.15% and 50% of deformation, in MPa. The hysteresis is expressed by the measurement of tan δ at 7% deformation and at 23° C. according to ASTM Standard D 2231–71 (reapproved in 1977).

EXAMPLE 1

A—Continuous Preparation of Functionalized and Nonfunctionalized Copolymers

The following are prepared: a butadiene-styrene copolymer bearing an end silanol functional group with the aid of a cyclic siloxane functionalizing agent (SBR-A), a nonfunctionalized butadiene-styrene copolymer stopped with methanol (SBR-B) and a functionalized butadiene-styrene copolymer (SBR-C) with a trialkoxysilane, 3-glycidyloxypropyltrimethylsiloxane (GPTSi).

The last two copolymers are used as reference. The SBR-C. is a functionalized polymer, the process for the preparation of which is described in French Patent Application FR-94/08,887 filed on 15/07/1994, the content of which is incorporated by reference in the present application.

A butadiene-styrene copolymer is prepared in a reactor of 14-liter working capacity with a turbine-type stirrer, into which toluene, butadiene, styrene and tetrahydrofuran in the mass ratio 100:10:4.3:0.3 and a solution of 500 micromoles of active n-butyllithium (n-BuLi) per 100 g of monomers is introduced continuously. The flow rates of these various solutions are calculated to have a residence time of 45 minutes with strong stirring. The temperature is kept constant at 60° C. On leaving the reactor, the conversion measured on a sample is 88%. The SBR contains 26% of incorporated styrene (on a mass basis) and a content of 41% of 1,2-bonds in the case of the butadiene portion.

To obtain SBR-A, hexamethylcyclotrisiloxane ($D_3$) is added at the reactor outlet, at the entry of a static mixer, in a $D_3$/active n-BuLi ratio=0.48. The functionalization reaction is performed at 60° C. In the context of the synthesis of SBR-B, methanol is added instead of the compound $D_3$ in an MeOH/active n-BuLi ratio=1.5. In the context of the synthesis of SBR-C, GPTSi is added instead of $D_3$, in a GPTSi/active n-BuLi ratio=2. In this last case, in order to prevent sudden increase in viscosity, the GPTSi is injected into a dynamic mixer fitted with a stirrer controlled at a rotational speed of 2500 rev/min.

In the three cases, after 5 minutes, 0.8 parts per hundred parts of elastomer (phe) of 2,2'-methylenebis(4-methyl-6-tert-butylphenol) and 0.2 phe of N-(1,3-dimethyl-butyl)-N'-phenyl-p-phenylenediamine are added as antioxidants. The polymers are recovered by the conventional recovery operation using steam stripping of the solvent and are then dried on a roll mill at 100° C. for 10 minutes. The inherent viscosities (dl/g) are measured at 25° C. in solution at a concentration of 1 g/l in toluene, before the stripping operation.

The functional group contents (Fn) are calculated using $^1$H NMR and following the determination of the molecular mass by osmometry. In the three cases the molecular mass is 175,000 g mol$^{-1}$. The functional group content (Fn) is defined as the molar ratio of functional group bonded to the polymer per mole of polymer. The $^1$H NMR analyses are performed in $CS_2$ on samples which have undergone three cycles of dissolving in toluene and coagulation in methanol, in order to remove any trace of residual functionalizing agent, that is to say which is not bonded to the polymer. The $^1$H NMR spectrum of the functionalized SBR-A is characterized by unresolved bands at 0 ppm and –0.1 ppm, corresponding to the [–Si(C$\underline{H}_3$)$_2$–OH] group. The $^1$H NMR spectrum of the GPTSi functionalized SBR-C. is characterized by an unresolved band at 3.40 ppm, corresponding to the [–Si(OC$\underline{H}_3$)$_2$] unit.

The results of analysis are listed in Table 1.

TABLE 1

| SBR | Agent | Inh. visc. | Mooney | $Si(CH_3)_2$ meq/kg | $Si(OCH_3)_2$ meq/kg | Fn |
|---|---|---|---|---|---|---|
| A | $D_3$ | 1.96 | 60 | 4.6 | — | 81 |
| B | MeOH | 1.99 | 59 | — | — | — |
| C | GPTSi | 2.01 | 62 | — | 4.7 | 82 |

The results show that:

the SBR-A functionalized polymer has a functional group content of 81%. This content is the same as that of a polymer functionalized with GPTSi.

the SBR-A functionalized polymer does not undergo any change in macrostructure during the stripping operation and therefore no qualitative or quantitative deterioration of the silanol functional groups, which is quite surprising to a person skilled in the art.

B–Preparation of the Compositions

The 3 copolymers described above are used in a composition produced according to the method described in Patent Application EP-A-0 501 227, incorporated in the present application, it being specified that thermomechanical work is carried out in two stages which last 5 and 4 minutes, respectively, with a mean blade speed of 45 revolutions/minute until an identical maximum drop in temperature of 160° C. is reached, while the introduction of the vulcanizing system is performed at 30° C. on a roll mill.

The following formulation is employed for producing the 7 compositions, all the parts being expressed by weight:

| | |
|---|---|
| Elastomer | 100 |
| Silica (*) | 80 |
| Aromatic oil | 40 |
| Bonding agent (**) | 6.4 |
| Zinc oxide | 2.5 |
| Stearic acid | 1.5 |
| Antioxidant (a) | 1.9 |
| Paraffin wax (b) | 1.5 |
| Sulfur | 1.1 |
| Sulfenamide (c) | 2 |
| Diphenylguanidine | 1.5 |

(*) The silica is a highly dispersible silica in micropearl form, marketed by the company Rhône-Poulenc under the trade name Zeosil 1165 MP.
(**) Polysulfided organosilane marketed by the company Degussa under the name SI69.
(a) antioxidant: N-(1,3-dimethylbutyl)-N'phenyl-p-phenylenediamine
(b) paraffin wax: mixture of macro- and microcrystalline waxes
(c) sulfenamide: N-cyclohexyl-2-benzothiazylsulfenamide The vulcanization is performed at 150° C. for 40 minutes. The properties of these 3 compositions both in the unvulcanized state and in the vulcanized state are compared with each other.

The results are listed in Table 2.

TABLE 2

| Compositions | SBR-A | SBR-B | SBR-C |
|---|---|---|---|
| Properties in the unvulcanized state | | | |
| Mooney | 83 | 67 | 75 |
| Properties in the vulcanized state | | | |
| Shore A | 59.7 | 66.0 | 61.0 |
| EM10 | 4.33 | 5.01 | 4.49 |
| EM100 | 1.59 | 1.57 | 1.63 |
| EM300 | 2.08 | 1.82 | 2.14 |
| EM300/EM100 | 1.31 | 1.16 | 1.31 |
| Scott breaking indices at | | | |
| 20° C. BS | 22.8 | 19.8 | 20.8 |
| 20° C. EB % | 600 | 600 | 540 |
| HL 60° C. (*) | 23.8 | 34.7 | 25.3 |
| Dynamic properties as a function of the deformation | | | |
| ΔG at 23° C. | 1.84 | 4.80 | 2.34 |
| tan δ at 23° C. | 0.273 | 0.380 | 0.317 |

(*) the deformation in the case of this hysteresis loss is 40%.

With regard to the properties in the vulcanized state it is found, on the one hand, that, overall, the mechanical strength of the composition comprising the silanol functionalized SBR-A in accordance with the invention is superior to that of the reference compositions using SBR-B and -C, which is favorable where the wear resistance of a tire fitted with a tread consisting of such a composition is concerned and, on the other hand, that the hysteresis properties both at high and at low deformations are improved in relation to those exhibited by the compositions using SBR-B and -C, which is favorable for lowering the rolling resistance of a tire fitted with a tread consisting of such a composition and for forming a tread undercoat or a sidewall rubber.

EXAMPLE 2

A–Noncontinuous Preparation of Functionalized and Nonfunctionalized Copolymers

Preparation of Silanol Functionalized SBR-D

In a first stage a butadiene-styrene copolymer is prepared by injecting 167 g of styrene, 476 g of butadiene and 2000 ppm of THF into a 10-liter reactor containing 6.4 liters of deaerated heptane. The impurities are neutralized with the aid of n-BuLi and then 0.0038 mol of n-BuLi are added, together with 0.0011 mol of sodium tert-butylate, employed as randomizing agent; the polymerization is conducted at 55° C.

In a second stage, at 90% conversion, an aliquot portion is removed, the reaction is interrupted with methanol and the viscosity of the polymer, which is 1.40 dl/g, is measured. Moreover, 0.0013 mol of hexamethylcyclotrisiloxane ($D_3$) are injected into the reactor. The polymer solution is stirred for 15 minutes at 55° C. The conversion and the viscosity have not changed at the end of this operation. The polymer is stabilized against oxidation by addition of 0.80 phe of 2,2-methylene bis(4-methyl-6-tert-butylphenol) and 0.20 phe of N-(1,3-dimethylbutyl)-N'-phenyl-p-phenylenediamine, and then recovered by stripping with steam and dried on a roll mill at 100° C.

The inherent viscosity after stopping of the copolymer (SBR-D) is 1.40 dl/g, the Mooney viscosity ML(1+4, 100° C.) is 26 and the percentage of styrene which is incorporated, determined by proton NMR, is 26% (mass percentage) and the content of vinyl chain sequences is 41% of the butadiene portion.

NMR analysis gives a [—$Si(CH_3)_2$]—OH functionalization content of 4.5 meq/kg, which corresponds to an [SiOH] functionalization content of approximately 70%, taking into account the molecular mass of the copolymer, given by osmometry (155,000 g/mol).

Preparation of Nonfunctional SBR-E Stopped with Methanol

In a first stage a copolymerization is performed in the operating conditions which are identical with those described for the preparation of SBR-D.

In a second stage, at 90% conversion, 0.008 mol of methanol are injected into the reactor. The polymer solution is stirred for 15 minutes at 55° C. The polymer is stabilized against oxidation by addition of 0.20 phe of 2.2'-methylenebis(4-methyl-6-tert-butylphenol) and 0.20 phe of N-(1,3-dimethylbutyl)-N'-p-phenylenediamine, and then recovered by stripping with steam on a roll mill at 100° C.

The inherent viscosity of the stopped polymer (SBR-E) is 1.40 dl/g, the Mooney viscosity ML(1+4, 100° C.) is 26, the percentage of styrene incorporated is 26% (mass percentage) and the content of vinyl chain sequences is 41% relative to the butadiene portion.

Preparation of GPTSi Functionalized SBR-F 1670 g of styrene, 4760 g of butadiene and 2000 ppm of THF are injected into a 100-liter reactor containing 64 liters of deaerated heptane. The impurities are neutralized with the aid of n-BuLi and then 0.044 mol of n-BuLi are added, together with 0.0013 mol of sodium tert-butylate, employed as randomizing agent; the polymerization is conducted at 55° C.

At 90% conversion an aliquot portion is removed, is stopped with methanol and the viscosity of the polymer is measured: 1.25 dl/g. With the remainder the GPTSi functionalization is performed at the reactor outlet during the draining. GPTSi (0.176 mol) is added to the living polymer at the entry of a dynamic mixer of 1.6-liter capacity, fitted with a stirrer controlled at a rotational speed of 1500 rev/min. The draining time is 90 seconds.

After 15 minutes' stirring in a second reactor situated downstream of the dynamic mixer the polymer is stabilized against oxidation by addition of 0.80 phe of 2,2'-methylenebis(4-methyl-6-tert-butylphenol) and 0.20 phe of N-(1,3-dimethylbutyl)-N'-p-phenylenediamine, and then recovered by stripping with steam and dried on a roll mill at 100° C.

The inherent viscosity of the functionalized copolymer SBR-F is 1.42 dl/g, the Mooney viscosity ML(1+4, 100° C.) is 30, the percentage of styrene incorporated, determined by proton NMR is 26% (mass percentage) and the content of vinyl chain sequences is 41% of the butadiene portion.

$^1$H NMR analysis gives a silicon content of 4.1 meq/kg, which bears witness to a good functionalization level, bearing in mind the molecular mass of the copolymer, given by osmometry (170,000 g/mol).

B—Preparation of Compositions

The 3 copolymers prepared noncontinuously above are used in a composition which is identical to that described in the preceding example. The results are listed in Table 3.

TABLE 3

| Compositions | SBR-D | SBR-E | SBR-F |
|---|---|---|---|
| Properties in the unvulcanized state | | | |
| Mooney | 74 | 47 | 59 |
| Properties in the vulcanized state | | | |
| Shore | 57.1 | 65.0 | 59.6 |
| EM10 | 3.65 | 5.10 | 4.14 |
| EM100 | 1.60 | 1.59 | 1.70 |
| EM300 | 2.28 | 1.85 | 2.34 |
| EM300/EM100 | 1.43 | 1.16 | 1.38 |
| Scott breaking indices at | | | |
| 20° C. BS | 21.6 | 19.4 | 20.8 |
| 20° C. EB % | 550 | 590 | 520 |
| HL 60° C. (*) | 20.6 | 35.0 | 24.0 |

TABLE 3-continued

| Compositions | SBR-D | SBR-E | SBR-F |
|---|---|---|---|
| Dynamic properties as a function of the deformation | | | |
| ΔG at 23° C. | 1.00 | 4.90 | 1.32 |
| tan δ at 23° C. | 0.204 | 0.384 | 0.232 |

(*) the deformation in the case of this hysteresis loss is 40%.

In the light of the properties in the vulcanized state, SBR-D endows the composition in which it is used and which is in accordance with the invention with hysteresis properties at low deformation and at high deformation and reinforcement and break strength properties which are significantly better than those obtained with the reference composition using SBR-F and very greatly improved in relation to the reference composition using SBR-E.

EXAMPLE 3

A—Continuous Preparation of Functionalized and Nonfunctionalized Copolymers

A butadiene-styrene copolymer bearing an end silanol functional group is prepared with the aid of a linear organosilane functionalizing agent, in this case dichlorodimethylsilane (SBR-H). Two reference copolymers are also prepared as in Example 1, namely a butadiene-styrene copolymer functionalized with the aid of GPTSI (SBR-I) and a nonfunctionalized butadiene-styrene copolymer stopped with methanol (SBR-G).

A 32-liter reactor is continuously charged with a solution of toluene, butadiene, styrene and tetrahydrofuran. The mass ratio of these products is 100:10.1:4.1:0.3 respectively. This reactor is also continuously fed with 0.890 mmol of n-BuLi per hundred grams of monomers. The polymerization is conducted at 60° C. with strong stirring and the flow rate of the constituents is adjusted to have a mean residence time of 45 minutes.

At the reactor outlet the conversion, measured on a sample, is 92%. The polymer contains 25% of styrene (on a mass basis) and is characterized by a content of vinyl chain sequences of 41% of the butadiene fraction.

At the reactor outlet, at the entry of a static mixer, dichlorodimethylsilane $(CH_3)_2SiCl_2$ is added in a $[(CH_3)_2SiCl_2]/$[active n-BuLi] ratio of 1.5. The polymer SBR-H thus obtained is recovered by stripping with steam after the addition of 0.8 phe of 2,2'-methylenebis(4-methyl-6-tert-butylphenol) and 0.2 phe of N-(1,3-dimethylbutyl)-N'-phenyl-p-phenylenediamine as antioxidants, and then dried on a roll mill at 100° C. It has an inherent viscosity of 1.52 dl/g and a Mooney viscosity of 32. $^1$H NMR analysis gives an [SiOH] functionalization content of 8.0 meq/kg, which corresponds to a functional group content Fn of 89% (molecular mass of 110,000 g/mol given by osmometry).

It is found that at a [functionalizing agent]/[reactive end] ratio of 1.5 the coupling reaction between chains is not significant. Furthermore, there is no macrostructural change in the polymer during the stripping operation.

The same procedure is employed for preparing 3 copolymers functionalized with the following functionalizing agents:

dichlorodiphenylsilane (DCDPSi)-(SBR-J), dichlorophenylmethylsilane (DCPMSi)-(SBR-K) and dichlorovinylmethylsilane (DCVMSi)-(SBR-L), except that a dynamic mixer fitted with a stirrer controlled at 2500 revolutions/min is employed and that the antioxidants are added after 5 minutes.

The results of analysis of the polymers are listed in Table 4.

TABLE 4

| SBR | Agent | Inh. visc. | Mooney | Fn* | SV |
|---|---|---|---|---|---|
| G |  | 1.47 | 30 |  |  |
| H | (CH)$_2$SiCl$_2$ | 1.52 | 32 | 89 | 1.03 |
| J | DCDPSi | 1.50 | 32 | — | 1.02 |
| K | DCPMSi | 1.54 | 31 | 78 | 1.05 |
| L | DCVMSi | 1.54 | 33 | 72 | 1.05 |

*the molecular mass measured by osmometry of the polymer H is 110,000 g/mol; this value has also been employed to determine the functional group contents of polymers K and L.

Just as SBRH, SBR J, K and L have not undergone any macrostructural change during the stripping and drying operations.

For the preparation of SBR-G and of SBR-I the operation is carried out in the same conditions as for SBR-B and SBR-C, respectively, in Example 1. SBR-G has an inherent viscosity of 1.47 dl/g and a Mooney viscosity of 30. SBR-I thus prepared has an inherent viscosity of 1.48 dl/g, a Mooney viscosity of 30 and a functionalization content determined by NMR of 7.7 meq/kg (Fn of 85%, molecular mass of 110,000 g/mol).

B—Preparation of Compositions

The six copolymers prepared above are used in a composition which is identical to that described in Example 1. The results are listed in Table 5.

TABLE 5

| Compositions | SBR G | SBR H | SBR J | SBR K | SBR L | SBR I |
|---|---|---|---|---|---|---|
| Properties in the nonvulcanized state | | | | | | |
| Mooney | 42 | 62 | 61 | 63 | 65 | 57 |
| Properties in the vulcanized state | | | | | | |
| Shore | 67.0 | 59.3 | 59.3 | 58.9 | 59.3 | 59.0 |
| EM10 | 5.21 | 4.09 | 4.19 | 4.02 | 4.19 | 4.02 |
| EM100 | 1.60 | 1.59 | 1.66 | 1.59 | 1.59 | 1.63 |
| EM300 | 1.85 | 1.97 | 2.06 | 2.08 | 1.97 | 2.14 |
| EM300/EM100 | 1.16 | 1.24 | 1.24 | 1.31 | 1.24 | 1.31 |
| SCOTT breaking indices at | | | | | | |
| 20° C. BS | 19.1 | 20.3 | 20.0 | 19.8 | 20.0 | 20.5 |
| 20° C. EB % | 590 | 590 | 580 | 590 | 560 | 580 |
| HL 60° C. (*) | 36.7 | 28.0 | 28.0 | 27.6 | 28.0 | 28.0 |
| Dynamic properties as a function of deformation | | | | | | |
| ΔG at 23° C. | 4.98 | 1.96 | 2.04 | 1.97 | 2.05 | 1.60 |
| tan δ at 23° C. | 0.398 | 0.275 | 0.280 | 0.275 | 0.282 | 0.264 |

(*) the deformation in the case of this hysteresis loss is 40%.

The properties of the compositions in the vulcanized state show that the compositions in accordance with the invention have hysteresis properties at low deformation and at high deformation and reinforcement and break resistance properties which are identical or very close to those obtained with the reference composition based on SBR-I and very greatly improved in relation to those of the reference composition using nonfunctionalized SBR-G, which is very favorable for obtaining a tire which has a reduced rolling resistance when this composition in accordance with the invention is employed either as tread or as tread undercoating or as sidewall rubber.

We claim:

1. A vulcanizable rubber composition comprising at least one functionalized diene polymer, a reinforcing filler which comprises silica, and an organosilane bonding agent for coupling the functionalized diene polymer to the silica; wherein the functionalized diene polymer is a diene polymer bearing as a chain end (a) a single silanol functional group, or (b) a polysiloxane block which has a single silanol end; wherein the diene polymer is selected from the group consisting of a diene homopolymer, a copolymer of diene monomers, and a copolymer of diene monomers and vinylaromatic compounds, and wherein the silica is present as major component of the reinforcing filler.

2. The composition as set forth in claim 1, wherein the polysiloxane block which has a silanol end corresponds to the formula:

in which:

$R_1$ and $R_2$, which are identical or different, denote an alkyl, cycloalkyl, aryl, alkaryl, aralkyl or vinyl group which has from 1 to 10 carbon atoms, x is an integer ranging from 3 to 1500.

3. The composition as set forth in claim 2, wherein $R_1$ and $R_2$ denote an alkyl group which has from 1 to 5 carbon atoms.

4. The composition as set forth in claim 1, wherein the diene polymer is a butadiene-styrene or butadiene-styrene-isoprene copolymer.

5. The composition as set forth in claim 4, wherein the composition additionally includes polybutadiene, a butadiene-isoprene copolymer, natural rubber, or mixtures thereof.

6. The composition as set forth in claim 1, wherein the reinforcing filler consists essentially of silica.

7. The composition as set forth in claim 1, wherein the reinforcing filler comprises silica as a major component of the filler and carbon black as a minor component of the filler.

8. The composition as set forth in claim 1, wherein the silica is a highly dispersible precipitated silica which has a CTAB surface ≦450 m$^2$/g and a BET surface ≦450 m$^2$/g.

9. The composition as set forth in claim 8, wherein the silica has a BET specific surface/CTAB specific surface ratio ≧1 and ≦1.2.

* * * * *

UNITED STATES PATENT AND TRADEMARK OFFICE
CERTIFICATE OF CORRECTION

PATENT : 6,013,718
DATED : January 11, 2000
INVENTOR(S) : Cabioch et al.

It is certified that error appears in the above-identified patent and that said Letters Patent is hereby corrected as shown below:

On the Cover:

[75] Inventors: "Clermot-Ferrand" should read -- Clermont-Ferrand --;

Column 1, line 38: "agent" should read -- agents --;
Column 3, line 20: "sequential/" should read -- sequential --;
Column 3, line 21: "sequential/microblock," should read -- sequential microblock, --;
Column 4, line 12: "is" should read -- are --;
Column 4, line 63: "Sio⁻" should read -- SiO⁻ --;
Column 5, line 18: : "Sio⁻" should read -- SiO⁻ --;
Column 5, line 31: : "Sio⁻" should read -- SiO⁻ --;

Column 14, line 20: "major" should read -- a major --.

Signed and Sealed this

Fifteenth Day of May, 2001

*Attest:*

NICHOLAS P. GODICI

*Attesting Officer*    Acting Director of the United States Patent and Trademark Office